United States Patent [19]

Lok

[11] 4,343,717
[45] Aug. 10, 1982

[54] PROCESS FOR THE PREPARATION OF STABLE SILICA SOL

[75] Inventor: Brent M. Lok, New City, N.Y.

[73] Assignee: Union Carbide Corporation, Danbury, Conn.

[21] Appl. No.: 119,649

[22] Filed: Feb. 8, 1980

[51] Int. Cl.$^3$ .............................................. B01J 13/00
[52] U.S. Cl. ........................... 252/313 S; 106/287.34; 252/450
[58] Field of Search ................... 252/313 S; 106/38.3, 106/287.34

[56] References Cited

U.S. PATENT DOCUMENTS

| | | | |
|---|---|---|---|
| 2,940,939 | 6/1960 | Podschus et al. | 252/313 S |
| 3,494,874 | 2/1970 | Flanigen et al. | 252/450 |
| 3,929,493 | 12/1975 | Lee, Jr. et al. | 106/287.34 X |

FOREIGN PATENT DOCUMENTS 521741  2/1956  Canada ............................ 252/313 S

OTHER PUBLICATIONS

Iler: *The Chemistry of Silica*, publ. by John Wiley & Sons, 1979, pp. 222-233 and 364-365.

*Primary Examiner*—Richard D. Lovering
*Attorney, Agent, or Firm*—William R. Moran; Gerald L. Coon

[57] ABSTRACT

Stable, colloidal, silica sol is provided by a process which comprises vigorously mixing a slurry of calcium silicate with a dilute acid having a $pK_a$ value of less than about 8, such as sulfuric acid, and thereafter separating the sol from the insoluble precipitate of calcium salt. The process provides an inexpensive method for production of the sol as opposed to those methods which currently use sodium silicate as the starting material.

12 Claims, No Drawings

PROCESS FOR THE PREPARATION OF STABLE SILICA SOL

FIELD OF THE INVENTION

This invention relates to a process for the preparation of a stable, colloidal silica sol.

DESCRIPTION OF THE PRIOR ART

Silica sol and silica gel have for many years been employed in a variety of industries, such as those requiring the use of absorbents, catalyst bases, binders, antisoiling agents, thickening agents and the like. In particular silica sol is widely used as binders for insulating materials and catalyst manufacture.

The present commercial processes for the production of colloidal silica sol all use sodium silicate as the starting material. However, the increasing cost of sodium silicate has escalated the ultimate cost of the silica sol or gel to the consumer. Hence, the large volume of silica sol used commercially dictates that the most economical process be employed in its production.

In U.S. Pat. No. 3,494,874 which issued on Feb. 10, 1970 to E. M. Flanigen and R. W. Grose there is disclosed a process for preparing a silica gel agglomerate. The silica gel is prepared by the controlled extraction of a narrow class of metal silicates with aqueous acids having $pK_a$ values of less than about 3. It is also indicated in the patent that the properties of silica gels can vary over a wide range depending upon their method of preparation and only a relatively few can be considered as practical adsorbent materials. One conventional method referred to in the patent for preparing adsorbent quality silica gels is the acidification and gelation of water solutions of soluble silicates, such as sodium silicate. The patentees indicate that they can obtain siliceous materials which are ideally suited as adsorbents by extracting certain metal silicates with inorganic acids having the above $pK_a$ values. Among the many metal silicate compounds disclosed is calcium metasilicate, such as wollastonite. The cited patent, however, is directed to the preparation of a silica gel agglomerate as opposed to a stable, colloidal silica sol. Hence, prior to the present invention, all of the known, commercial methods for preparing stable, colloidal silica sol used sodium silicate as the starting material.

Accordingly, one or more of the following objects can be achieved by the practice of this invention. It is an object of this invention to provide a process for the preparation of stable, colloidal silica sol from relatively inexpensive starting materials. A further object of this invention is to provide a process for preparing a silica sol having a particle size and weight percent silica which renders it ideally suitable as a binder. Another object of the invention is to provide a process for the preparation of a stable silica sol of a desired particle size and weight percent which involves a simple precipitation and ion exchange technique. These and other objects can readily be achieved in accordance with the teachings herein set forth.

SUMMARY OF THE INVENTION

In its broad aspect, the present invention is directed to a process for the preparation of stable, colloidal silica sol which comprises the steps of:

(a) forming an aqueous slurry of calcium silicate, (b) vigorously mixing the slurry and simultaneously adding a dilute acid having a $pK_a$ value of less than about 8, the anion of which forms a precipitate with the calcium ion, (c) heating the slurry at a temperature of up to about 100° C., and for a period of time until precipitation is complete, (d) filtering the slurry and contacting the filtrate with at least one ion exchange resin, (e) recovering the silica sol, and (f) thereafter stabilizing and concentrating the sol to provide the colloidal silica sol.

DESCRIPTION OF THE PREFERRED EMBODIMENT

It has now been found that a stable, colloidal silica sol, for example, one comprised of 15 weight percent silica and having average particle sizes of from 3–13 m$\mu$, can readily be formed by reacting calcium silicate and a dilute acid having a $pK_a$ value of less than about 8, such as 0.5–1 N sulfuric acid. The term $pK_a$ is used herein in its conventional sense as representing the negative logarithm of the acidic concentration ionization constant.

The procedure involves extraction of calcium from calcium silicate, separation of silica sol from calcium sulfate, removal of impurity ions by ion exchange method and finally stabilization and concentration. This method provides an alternative way to the present commercial process of making colloidal silica sol by using sodium silicate as a starting material, which as hereinbefore indicated has economic disadvantages. Calcium silicate is an especially good choice, since the cost of the starting materials for making calcium silicates, i.e., lime and silica, has remained low in the pennies per pound range. Also the readily available mineral material (wollastonite) is in the 1–3 cent per pound range.

As in the case of making silica gel from calcium silicate, calcium can be extracted from the "framework" to form soluble or insoluble salts with different acids. For making silica sol, those acids which form insoluble calcium salts are favored, because the formation of soluble salt could cause coagulation of colloidal silica particles and result in large size particles or silica gel. The critical concentration of calcium ions in solution required to coagulate colloidal silica with respect to pH and particle size is known in the art. For example, the concentration of calcium ions needed to completely coagulate the colloidal silica is only in the millimolar range. Thus, if the acid used to extract calcium from calcium silicate forms a soluble calcium salt, the coagulation of colloidal silica would be unavoidable, unless cation exchange resin is employed during the extraction process to remove calcium ions as soon as they are formed. Such a process is very similar to the present commercial process of making silica sol from sodium silicate. The commercial process of making silica sol is by neutralizing the basic sodium silicate with acid and meanwhile remove sodium ions by ion exchange process.

In the present process, sulfuric acid was extensively studied because it is the cheapest acid on the market. However, as previously indicated, any dilute acid having a $pK_a$ value of less than about 8 can be employed as long as it forms an insoluble salt with calcium and otherwise does not interfere with the preparation of the sol. Illustration acids in addition to sulfuric, include phosphoric and similar inorganic acids, and strong organic acids.

From experience in using sulfuric acid to extract calcium out of calcium silicate, it was found that the optimal ratio of calcium silicate to water is around 0.056 on weight basis (i.e., 25 grams of calcium silicate hydrate in 450 ml of distilled water). If the ratio is higher than 0.056, the final mix after extraction is very thick (due to the formation of insoluble calcium sulfate) and efficient mixing becomes very difficult. On the other hand, if the ratio is lower than 0.056, the amount of silica in the aqueous sol is reduced. Extraction of calcium by dilute ($\frac{1}{2}$–1 N) sulfuric acid can be achieved in less than one minute in a Waring blender at ambient temperature. After complete extraction, separation of silica sol from insoluble calcium sulfate can be easily accomplished by heating the mix from ambient to about 100° C., and preferably to about 60° C. and then filtering. The purpose of heating is to coagulate the calcium sulfate but not the colloidal silica particles. Several coagulation temperatures were tried (100° C., 80° C., 60° C. and 40° C.) and the results set forth in the Examples indicate that at 40°–60° C. range the growth of silica particles is minimal (<3 mμ). The particle growth rate is correlated to the amount of silica sol passing through Whatman No. 41 filter paper as summarized in Table 2. The more the wt. % of silica in the filtrate, the smaller the particle size and thus the slower the growth rate.

In preparing the silica sol of the present invention it was first thought that the silica sol filtrate thus obtained could be first stabilized and then concentrated down to the desired concentration. Commercial silica sols are usually stabilized by the addition of a small quantity of either sodium hydroxide or ammonium hydroxide to adjust the pH of the sol to the range of 8–10. Addition of sodium hydroxide to the dilute sol supposedly can be achieved by adding acidic sol slowly into a dilute sodium hydroxide solution with vigorous stirring. However, it was unexpectedly and surprisingly found that silica gel instead of silica sol was obtained. The reason for the gelation of silica sol is believed to be due to the excess amount of impurity ions in the sol. Since the starting materials, lime, sand and wollastonite, all contain fairly large amounts of impurity (87–95% CaO in lime, ~98% $SiO_2$ in sand and ~98% $CaSiO_3$ in wollastonite), one would expect 0.3% or more impurities (Mg, Al, etc.) in the dilute sol. If the dilute sol was first treated with cation and anion exchange resin and then stabilized with NaOH solution, a stable dilute silica sol was obtained. To make concentrated silica sol (20% or more $SiO_2$ by weight), the dilute sol is concentrated by evaporation.

By conducting the process as hereinbefore indicated it was observed that the separation of silica and calcium sulfate by a one step filtration was very successful. The amount of silica in the filtrate is about 77 wt. % of the total silica content of the starting material. And the amount of calcium sulfate in the filtrate is very small (0.2 wt. %). However, in the filter cake, 86 wt. % is calcium sulfate and only 5 wt. % is silica. Chemical analysis of sol samples prepared by the process of this invention also indicates that a fairly large amount of silica (~0.6 wt. %) was trapped in the ion exchange columns during the ion exchange processes. Thus resulted a final yield of silica of only 56%. On the other hand, the ion exchange columns trapped almost all of the calcium sulfate particles and resulted in a very pure final silica sol product ($CaSO_4$ wt. % <0.034%). The particle size remained relatively constant in all the dilute sols (all around 3–5 mμ) and increased some (3–13 mμ) only when the dilute silica sol was condensed down to ~15 wt. % of silica. Such a particle growth is mainly due to the long heating effect during the conversion process.

One of the starting materials, hydrated calcium silicate, used in the following examples was made in the laboratory under hydrothermal condition ($CaO/SiO_2$=0.9, autoclaved at 385° F. for 24 hours), and it was determined by analysis to be a xonotlite-rich material. Powder was obtained by breaking up a monolith in a Waring blender. The other one, wollastonite, a (Grade P-4) calcium silicate, was obtained from Interpace Corporation.

Reagent grade sulfuric acid was used for extraction. The desired concentration was achieved by diluting concentrated acid with distilled water. pH measurements were obtained by using a Sargent-Welch pH/activity meter (Model PAX). Orion calcium ion specific electrode was used to detect the calcium ion activity in the silica sol.

All the filtration processes were done with Buchner funnel and Whatman No. 41 filter paper under vacuum (aspirator). The ion exchange resin was purchased from Rohm and Haas Company under the tradename of Amberlite (IR-120 and IR-45). Ion exchange was performed in a Pyrex glass column.

Transmission electron microscopic studies involved dilution of silica sol by distilled water followed by ultrasonic dispersion. The turbidity measurements were obtained by passing 410 Å wavelength light through a one centimeter quartz sample cell with a slit width of 0.032 mm in a Cary 14 instrument.

The following examples illustrate the best mode presently contemplated for the practice of the present invention:

The following Examples are illustrative.

EXAMPLE 1

Preparation of Hydrated Calcium Silicate

Hydrated calcium silicate was prepared from calcium silicate ($CaO/SiO_2$=0.9) by autoclaving the material at 385° F. for 24 hours and then drying overnight at 110° C. The starting material had a porosity of approximately 90 percent. X-ray crystalline composition and chemical analysis of the hydrated material are set forth in Table I below:

TABLE I

| CRYSTALLINE COMPOSITION | RUN 1 | RUN 2 |
|---|---|---|
| Xonotlite | 87 | 83 |
| Tobermorite | 3 | 10 |
| Amorphous | 9 | 6 |
| Quartz | Yes | Yes |

| CHEMICAL ANALYSIS | PERCENT |
|---|---|
| $SiO_2$ | 51.4 |
| CaO | 43.0 |

EXAMPLES 2–8

Preparation of Stable Silica Sol

The process was conducted by mixing 75 grams of the hydrated calcium silicate prepared in accordance with Example 1, with 1350 ml of distilled water in a Waring blender. (Due to the size of the Waring blender used, the mixing was completed in three consecutive runs.) While stirring vigorously, 34.5 ml of 95–98% sulfuric acid was added at once. An additional minute of stirring was carried out after addition of sulfuric acid. Then the slurry was poured into a glass beaker and heated to 60° C. with stirring (magnetic bar). The whole hot mix was filtered through a Buchner funnel with a Whatman No. 41 filter paper under vacuum drawn by an aspirator. The pH value of the filtrate collected at this point was approximately 1.5. After the filtrate cooled down to ambient temperature, the mix was poured first into a cation exchange column (filled with Amberlite IR-120) and then into an anion exchange column (filled with Amberlite IR-45). The pH values of the silica sol after passing the cation and anion exchange column were in the range of 1.3–1.5 and 5.7 to 7.6 respectively. The final pH of the dilute sol was adjusted by addition of 0.1 N NaOH to about 8.6. Concentration of the stabilized dilute sol was carried out in a rotavapor pumped with an aspirator. The temperature was maintained at 60° C. during the entire evaporation process.

The product of each preparation step was studied by means of pH measurements. Particle size measurement was done by transmission electron microscope, turbidity by light scattering and percent silica and calcium sulfate by wet chemical analysis. The results are summarized in Table II below:

a Whatman No. 41 filter paper under vacuum drawn by an aspirator. The pH value of the filtrate collected at this point was approximately 2.85 and the solid residue in the filtrate was determined to be 2.3 wt. %. After the filtrate cooled down to ambient temperature, the mix was poured first into a cation exchange column (filled with Amberlite IR-120) and then into an anion exchange column (filled with Amberlite IR-45). The pH value of the silica sol after passing the cation and anion exchange column were 2.3 and 7.9 respectively. The final pH of the dilute sol was adjusted by addition of 1 N NaOH to about 8.5. Concentration of the stabilized dilute sol was carried out in a Rotavapor pumped with an aspirator. The temperature was maintained at 65° C. during the entire evaporation process.

The product of each preparation step was studied by means of pH measurements. Particle size measurement was done by transmission electron microscope and percent silica and calcium sulfate by wet chemical analysis. The results are summarized in Table III below:

TABLE III

| Example | Material | pH | $SiO_2^{(1)}$ | $CaSO_4^{(1)}$ | Na | Ave. Particle Size (m$\mu$)$^{(2)}$ |
|---|---|---|---|---|---|---|
| 9 | Wollastonite | N.A. | 50.9% | N.A. | N.A. | N.A. |
| 10 | Filtrate | 2.9 | 2.0 | 0.17 | N.A. | 2–4 |
| 11 | Sol AFTER Passing Cation Exchange Column | 2.3 | 1.7 | <0.009 | N.A. | 2–4 |
| 12 | Sol AFTER Passing Anion Exchange Column | 7.9 | 2.5 | <0.009 | N.A. | 2–4 |
| 13 | Concentrated | 9.6 | 18.7 | 0.014 | 0.53% | 2–8 |

$^{(1)}$Weight percent
$^{(2)}$As determined by electron microscope (transmissions)
$^{(3)}$N.A.—not analyzed.

TABLE II

| EXAMPLE | MATERIAL | pH | $SiO_2^{(1)}$ | $CaSO_4^{(1)}$ | $Ca^{(1)}$ | $Ca^{+2(4)}$ | $Na_2O^{(1)}$ | AVE.$^{(2)}$ PARTICLE SIZE (m$\mu$) | TURBIDITY$^{(3)}$ $\tau$(Cm$^{-1}$) |
|---|---|---|---|---|---|---|---|---|---|
| 2 | Starting Material | N.A. | 51.4 | N.A. | 30.7 | N.A. | N.A. | N.A. | N.A. |
| 3 | Filter Cake | N.A. | 5.2 | 85.7 | 25.2 | N.A. | N.A. | N.A. | N.A. |
| 4 | Filtrate | 1.50 | 2.2 | 0.20 | 0.06 | 0.02 | N.A. | <3 m$\mu$ | 0.21 |
| 5 | Sol After Passing Cation Exchange Column | 1.35 | 2.0 | <0.034 | <0.01 | 0.003 | N.A. | 3–5 m$\mu$ | 0.17 |
| 6 | Sol After Passing Anion Exchange Column | 6.46 | 1.6 | <0.034 | <0.01 | 0.003 | N.A. | 3–5 m$\mu$ | 0.24 |
| 7 | Stabilized By NaOH | 8.70 | 1.6 | <0.034 | <0.01 | 0.003 | N.A. | 3–5 m$\mu$ | 0.35 |
| 8 | Concentrated | 9.12 | 14.7 | ~0.01 | 0.003 | N.A. | 0.25 | 3–13 m$\mu$ | N.A. |

$^{(1)}$Weight Percent.
$^{(2)}$As determined by electron microscope (transmissions).
$^{(3)}$Measure at 410A with a slit width of 0.032 mm by a cary-14 machine.
$^{(4)}$As determined by calcium specific electrode.
N.A.—Not analyzed.

EXAMPLES 9–13

Preparation of Stable Silica Sol from Wollastonite

The process was conducted by mixing 30 grams of wollastonite powder (Interpace Corporation Grade P-4) with 500 ml of distilled water in a Waring blender (due to the size of the Waring blender used, the mixing was repeated four times). While stirring vigorously, 13.6 ml of 95–98% sulfuric acid was added at once. The slurry was stirred for an additional five minutes after addition of sulfuric acid. Then the slurry was filtered without further heating (the temperature of the slurry after mixing was 40° C.) through a Buchner funnel with Although the invention has been illustrated by the preceding examples, it is not to be construed as being limited to the materials employed therein, but rather the invention encompasses the generic area as hereinbefore disclosed. Various modifications and embodiments thereof, can be made without departing from the spirit and scope thereof.

I claim:
1. A process for the preparation of stable colloidal silica sol which comprises the steps of:
(a) forming an aqueous slurry of calcium silicate,
(b) vigorously mixing said slurry while adding thereto, a dilute acid having a p$K_a$ value of less than about 8, said acid having an anion which forms a precipitate with the calcium ion,

(c) heating said slurry at a temperature up to about 100° C., and for a period of time until precipitation is complete,
(d) filtering said slurry and contacting the filtrate obtained therefrom with at least one ion exchange resin,
(e) recovering therefrom a silica sol, and
(f) stabilizing and concentrating said sol.

2. The process of claim 1 wherein after precipitation said slurry is filtered and the filtrate contacted first with a cation exchange resin and then with an anion exchange resin.

3. The process of claim 1 wherein after precipitation said slurry is filtered and the filtrate contacted first with an anion exchange resin and then with a cation exchange resin.

4. The process of claim 1 wherein said slurry in step (c) is heated to a temperature up to about 60° C.

5. The process of claim 1 wherein said slurry in step (c) is heated to a temperature within the range of from about 40° C. to about 60° C.

6. The process of claim 1 wherein said acid is dilute sulfuric acid.

7. The process of claim 1 wherein said acid is dilute phosphoric acid.

8. The process of claim 1 wherein said acid is an organic acid.

9. The process of claim 1 wherein said stable colloidal silica sol is stabilized with an ammonium hydroxide.

10. The process of claim 1 wherein said stable colloidal silica sol is stabilized with an alkaline hydroxide.

11. The process of claim 10 wherein said alkaline hydroxide is sodium hydroxide.

12. The process of claim 1 wherein said stable colloidal silica sol has average particle sizes of from about 3 to about 13 microns.

* * * * *